US012729512B2

(12) United States Patent
Caldwell et al.

(10) Patent No.: US 12,729,512 B2
(45) Date of Patent: Sep. 8, 2026

(54) SYSTEM AND METHOD FOR CONTROLLING BATTERY PRECONDITIONING IN A WORK MACHINE

(71) Applicant: Caterpillar Inc., Peoria, IL (US)

(72) Inventors: Curtis John Caldwell, Metamora, IL (US); Cedric Girin, St. Martin d'Uriage (FR)

(73) Assignee: Caterpillar Inc., Peoria, IL (US)

( * ) Notice: Subject to any disclaimer, the term of this patent is extended or adjusted under 35 U.S.C. 154(b) by 8 days.

(21) Appl. No.: 19/059,431

(22) Filed: Feb. 21, 2025

(65) Prior Publication Data

US 2026/0250933 A1 Aug. 27, 2026

(51) Int. Cl.

| | |
|---|---|
| ***E02F 9/26*** | (2006.01) |
| ***B60L 50/60*** | (2019.01) |
| ***B60L 58/14*** | (2019.01) |
| ***B60L 58/24*** | (2019.01) |
| ***E02F 3/34*** | (2006.01) |
| ***E02F 9/20*** | (2006.01) |

(52) U.S. Cl.

CPC ............ *E02F 9/2091* (2013.01); *B60L 50/60* (2019.02); *B60L 58/14* (2019.02); *B60L 58/24* (2019.02); *E02F 9/26* (2013.01); *B60L 2200/40* (2013.01); *B60L 2240/54* (2013.01); *B60L 2240/545* (2013.01); *B60L 2240/662* (2013.01); *E02F 3/34* (2013.01)

(58) Field of Classification Search

CPC .. E02F 9/2091; E02F 9/26; E02F 3/34; B60L 58/14; B60L 58/24; B60L 50/60; B60L 2200/40; B60L 2240/54; B60L 2240/545; B60L 2240/662

See application file for complete search history.

(56) References Cited

U.S. PATENT DOCUMENTS

| | | | | |
|---|---|---|---|---|
| 9,784,229 | B2 * | 10/2017 | Holub | F02N 11/0807 |
| 12,038,769 | B2 | 7/2024 | Lane | |
| 2015/0066837 | A1 * | 3/2015 | Twarog | B60L 58/12 706/58 |
| 2015/0329008 | A1 | 11/2015 | Karlson et al. | |
| 2022/0250506 | A1 | 8/2022 | Goldman-Shenhar et al. | |

(Continued)

FOREIGN PATENT DOCUMENTS

| | | | | |
|---|---|---|---|---|
| EP | 4029717 | A1 * | 7/2022 | B60L 50/60 |
| KR | 20240040095 | A | 3/2024 | |

(Continued)

*Primary Examiner* — Rami Khatib

(57) ABSTRACT

A battery-powered work machine includes a control system for determining a threshold state of charge for the battery at which to seek instruction from an operator whether to precondition the battery for a Fast Charge. The control system evaluates various current parameters in the machine, such as battery cell temperature, ambient temperature, battery state of health, battery size, and capacity of a battery thermal management system, to determine an expected change in the state of charge caused by preconditioning the battery. A buffer amount of charge is added to define the threshold state of charge. When the threshold exceeds a current state of charge for the battery, the control system provides notification via an operator interface for an operator to elect or refuse a Fast Charge with battery preconditioning.

20 Claims, 5 Drawing Sheets

(56) References Cited

U.S. PATENT DOCUMENTS

| | | | | |
|---|---|---|---|---|
| 2023/0099547 | A1* | 3/2023 | Mandel-Senft | H02J 7/44<br>320/109 |
| 2023/0166632 | A1 | 6/2023 | Braunstein et al. | |
| 2025/0183690 | A1* | 6/2025 | Johnson | H02J 7/47 |

FOREIGN PATENT DOCUMENTS

| | | | |
|---|---|---|---|
| KR | 102708825 | B1 | 9/2024 |
| WO | WO2023016655 | A1 | 2/2023 |
| WO | WO2024126340 | A1 | 6/2024 |

* cited by examiner

PASSIVE CORE
CONDENSER
EVAPORATOR
OPERATOR INTERFACE 106
ECM 130
SENSORS 250
TANK
BATTERY 112
206
212
202
232
234
230
236
238
240
242
132
208
204
224
222
220
210
200

SYSTEM AND METHOD FOR CONTROLLING BATTERY PRECONDITIONING IN A WORK MACHINE

TECHNICAL FIELD

The present disclosure relates generally to a system and method for controlling preconditioning of a battery that powers a work machine, and more specifically, to a control system of a work machine that notifies an operator of options for charging the battery during a job based on expected battery decrease from preconditioning.

BACKGROUND

Heavy work machines, such as earth-moving vehicles or hauling trucks, require significant power to carry out their functions. The machines themselves can be of substantial weight, and their loads require large amounts of power to move. Diesel engines traditionally provide that power, but they can have disadvantages. For instance, supplies of diesel fuel may be far away from a haul route or work location, and diesel machines can generate substantial pollution. Non-combustion power sources, such as rechargeable lithium ion batteries, can provide many advantages over diesel engines including enabling high levels of torque and being environmentally friendly.

When a battery (or series of batteries) is used as the power source onboard a work machine, recharging may frequently be required to increase its state of charge (SoC) to a desired level, potentially interrupting a job for the machine. Charging energy is transferred into battery cells most efficiently at a temperature or temperature range that depends on the chemistry of the cells, but typically is about 15-35 degrees C. (60-95 degrees F.). At these temperatures, the batteries can be charged more quickly than at higher or lower temperatures. When the speed of recharging is not important, such as for a so-called Slow Charge that may occur overnight at low power, the temperature of the batteries is generally not a major concern. When attempting to recharge the batteries quickly, such as for a so-called Fast Charge at high power, maintaining the optimal temperature for the batteries can impact the charging efficiency—and therefore the speed—of the recharging. Adjusting the temperature of the batteries to this value in preparation for and during a recharging event is generally called preconditioning.

Electrically-powered vehicles often include a battery thermal management system (BTMS) to adjust battery temperature during preconditioning, as well as when otherwise needed to improve battery performance and life. When operating as an active thermal system, the BTMS may include a refrigeration portion, a heating portion, and a circulating liquid that transfers heat to or from the battery to affect its temperature. While helpful to prepare for a Fast Charge, preconditioning batteries using an active thermal system can draw down the SoC, decreasing range and operability of the work machine.

One approach for initiating battery preconditioning in a vehicle with operator input is described in U.S. Patent App. Pub. No. 2022/0250506A1 ("the '506 application"). Passenger vehicles powered by batteries tend to have steadier rates of SoC depletion than heavy work machines, and the '506 application describes a process for preconditioning a vehicle battery either through manual request or through an automated system that predicts vehicle arrival at a charging station. Coordinated with a navigation system, the automated system may use predictive intelligence to provide a probability of a charging event at a known charging station based on the vehicle's location and the time and to synchronize a preconditioning event to the arrival at the charging station. However, the '506 application does not contemplate the significant and unpredicted energy that a work machine can expend in bursts while moving less than a few hundred meters at a job site or the absence of navigation assistance. Nor does the '506 application contemplate that the operating requirements of a heavy work machine generally make extensive interactions with an operator interface during a job undesirable and dangerous. As a result, the control system of the '506 application does not provide a desirable approach to controlling battery preconditioning in a work machine operating on a job site.

Examples of the present disclosure are directed to overcoming deficiencies of such systems.

SUMMARY

In an aspect of the present disclosure, a work machine includes a work implement, one or more actuators positioned to impart forces on the work implement, a battery configured to power the work machine and having a state of charge (SoC) and a battery cell temperature, and sensors positioned to detect at least the SoC and the battery cell temperature. The work machine further includes a battery thermal management system (BTMS) configured to regulate the battery cell temperature, an operator interface configured to receive inputs and to display outputs relating to operation of the work machine, and an electronic controller communicatively coupled to at least the BTMS and the operator interface. The electronic controller is configured to receive input from the sensors relating to the SoC and the battery cell temperature, and to determine an expected change in the SoC caused by preconditioning the battery under current operating conditions. Based, at least in part, on the expected change in the SoC, the electronic controller is configured to determine a threshold SoC at which to provide a notice on the operator interface, the notice being associated with a need to charge the battery. When the threshold SoC exceeds the SoC, the electronic controller is configured to provide the notice on the operator interface and monitor the operator interface for a response to the notice, where the response includes a request for a Fast Charge or a refusal of the Fast Charge. In absence of receiving the response within a predetermined time after the notice, the electronic controller is configured to command the BTMS to precondition the battery.

In another aspect of the present disclosure, a control system within a work machine includes a battery configured to power the work machine, the battery having a state of charge (SoC) and a battery cell temperature, a battery thermal management system (BTMS) configured to regulate the battery cell temperature using one of an active thermal mode and a passive thermal mode, an operator interface, and an electronic controller. The electronic controller is configured to calculate an expected decrease in the SoC caused by having the BTMS adjust the battery cell temperature to a preconditioning temperature under current operating conditions for the work machine, and based, at least in part, on the expected decrease in the SoC, determine a threshold SoC at which to communicate a notification relating to preconditioning the battery. After the SoC equals the threshold SoC, the electronic controller is configured to communicate the notification via the operator interface and to receive a response to the notification via the operator interface, where the response includes a request for a Fast Charge or a refusal of the Fast Charge. Based on the response, the electronic controller is further configured to instruct the BTMS to adjust the battery cell temperature using one of the active thermal mode and the passive thermal mode.

In yet another aspect of the present disclosure, a computer-implemented method, includes receiving, by an electronic controller, data relating to current operating conditions of a work machine powered by a battery, the current operating conditions including ambient temperature and a battery cell temperature of the battery, and calculating, by the electronic controller, an expected decrease in a state of charge (SoC) of the battery caused by having a battery thermal management system (BTMS) adjust the battery cell temperature to a preconditioning temperature under the current operating conditions. Based, at least in part, on the expected decrease in the SoC, the method includes determining a threshold SoC at which to provide a notification relating to preconditioning the battery, comparing the SoC to the threshold SoC, and after the SoC equals the threshold SoC, communicating the notification via an operator interface. The method further includes receiving a response relating to the notification via the operator interface and instructing the BTMS to regulate the battery cell temperature in response to the response.

BRIEF DESCRIPTION OF DRAWINGS

The detailed description references the accompanying figures. In the figures, the left-most digit of a reference number identifies the figure in which the reference number first appears. The same reference numbers indicate similar or identical items.

DETAILED DESCRIPTION

Consistent with the principles of this disclosure, a work machine that is powered by a battery, or an array of batteries, includes a control system for determining a threshold state of charge for the battery. The threshold state of charge indicates a battery level at which the control system seeks instruction from an operator whether to precondition the battery for a Fast Charge. The control system may evaluate various current parameters in the machine, such as battery cell temperature, ambient temperature, battery state of health, battery size, rate of change in state of charge, and capacity of a battery thermal management system, to determine an expected change in the state of charge that preconditioning the battery will cause. A buffer amount of charge may be added to the expected change in the state of charge to result in the threshold state of charge. During operation of the work machine, when the threshold state of charge exceeds a current state of charge for the battery, the control system provides notification via an operator interface, querying an operator to elect or refuse a Fast Charge with battery preconditioning. The control system then manages the battery temperature according to the operator's instructions, or in the absence of instructions, begins preconditioning so that the work machine is prepared to accept a Fast Charge to allow the work machine to perform additional activities in the near term. The following describes several examples for carrying out the principles of this disclosure.

Figure 1:
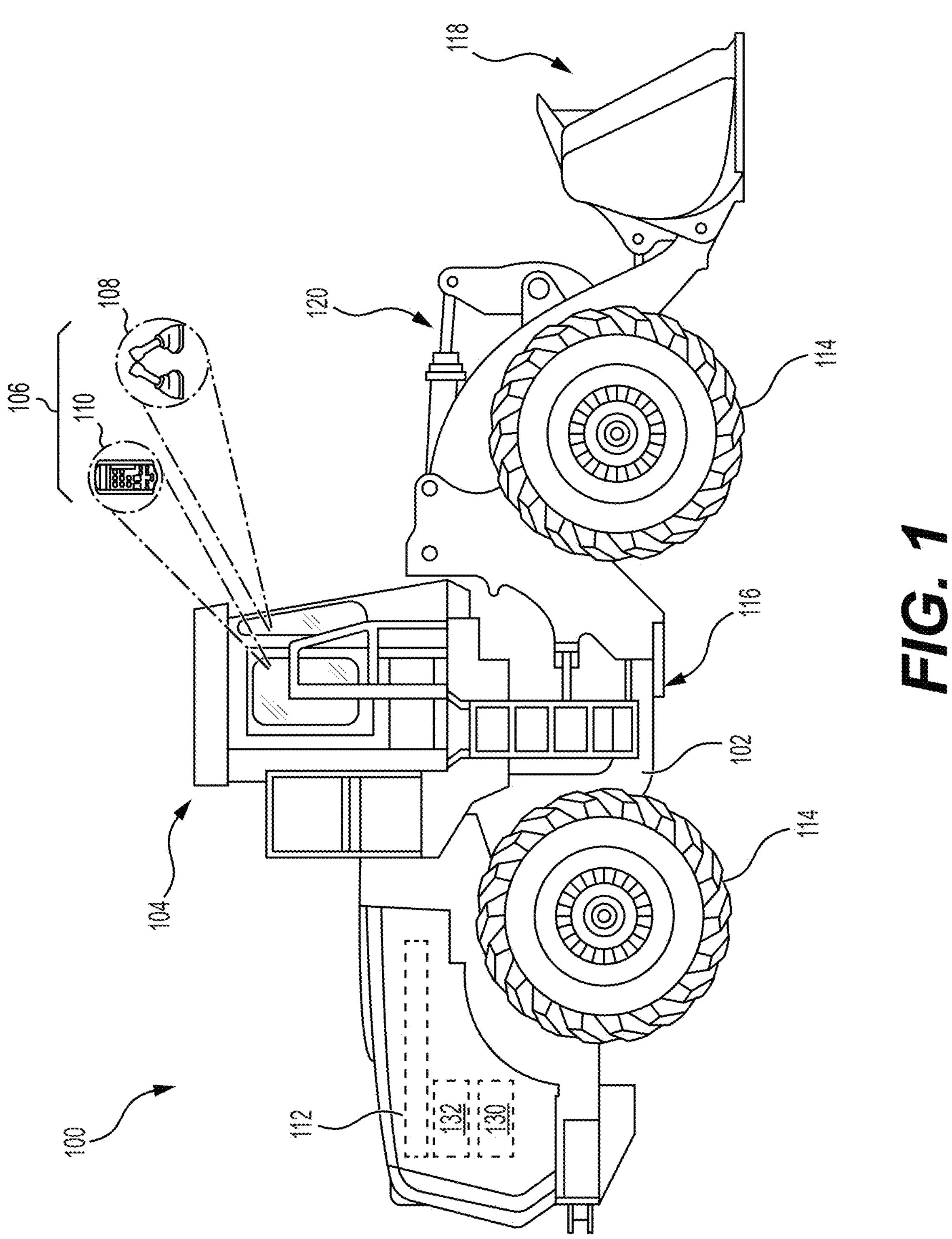
FIG. 1 is a schematic illustration of an electrically powered work machine in accordance with an example of the present disclosure.

FIG. 1 illustrates a side view of a work machine 100 as one example suitable for being powered by a battery and controlling preconditioning of the battery consistent with this disclosure. Exemplary work machine 100 is a wheel loader, which is a heavy machine having four wheels and a front-mounted bucket used to load, carry, and move materials. Wheel loaders are also known as front loaders, bucket loaders, scoop loaders, and skip loaders. In other implementations, work machine 100 need not haul a load and may be any machine associated with various industrial applications including, but not limited to, mining, agriculture, forestry, construction, and other industrial applications. The principles of the present disclosure may be applied to any work machine powered by a non-combustible source, such as a battery. These machines may include, for example, a paving machine, a cold planer, a grading machine, a backhoe loader, a wheel loader, a harvester, an excavator, a motor grader, a skid steer loader, a tractor, a dozer, a haul truck, and the like.

Referring to FIG. 1, example work machine 100 includes a frame 102 with an operator cab 104. The operator cab 104 provides an enclosure to house one or more operators of work machine 100. Typically, within operator cab 104, an operator interface 106 provides tools for the operator to interact with and control activity by work machine 100. For instance, operator interface 106 may include control sticks 108 to receive input from the operator for causing and controlling action by work machine 100. As shown, operator interface 106 may also include a monitor 110 that can provide feedback and status information to the operator through one or more of an analog, digital, and/or touchscreen display. In some options, monitor 110 includes devices for the operator to provide input to the machine, such as through a keyboard, mouse, touchscreen, directional pad, selector buttons, or any other suitable features for recording manually entered data. In various examples, monitor 110 may also display one or more additional buttons, icons, and/or other controls operable to control various respective functions of work machine 100 as discussed below. In still further options, monitor 110 and/or other components of operator interface 106 may be configured to receive such inputs via voice recognition, gesture recognition, and/or other input methodologies. Accordingly, operator interface 106 permits the operator to learn about and monitor the performance of work machine 100 from information shown on a screen such as monitor 110, while possibly also interacting with control sticks 108 to affect behavior of the machine.

Work machine 100 includes a non-combustion power source that at least includes a battery 112 mounted on or within frame 102. Battery 112 of work machine 100 can include one or more batteries, such as lithium-ion (Li-ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries. In some examples, multiple battery cells can be grouped together, in series or in parallel, within a battery module. Multiple battery modules can also be grouped together, for instance in series, within a battery string. One or more battery strings can be provided within a battery pack, such as a group of battery strings linked together in parallel. Accordingly, battery 112 can include one or more battery packs, battery strings, battery modules, and/or battery cells. Battery 112 supplies at least a portion of the power for operating various systems of work machine 100. In this way, work machine 100 can be a battery electric machine (BEM), a battery electric vehicle (BEV), a hybrid vehicle, a fuel cell and battery hybrid vehicle, or another mobile machine that is at least partially powered by battery 112.

Battery 112 provides electrical energy for various components to convert to mechanical energy within work machine 100. For instance, work machine 100 includes a powertrain 116 that may include drive motors, a transmission (e.g., an electric transmission), a reduction drive, an inverter, a drive shaft, one or more axles, and/or other components associated with an electric drive system. The drive motors may be in the form of electric engines, electric motors, electrical conversion systems, electric drivetrains, and/or other electrical components operably coupled to battery 112. The engines and systems are configured to convert and/or use energy stored in battery 112 to cause overall movement of work machine 100 and/or to cause movement of individual work tools and other components of work machine 100. In some examples, powertrain 116 may include an internal combustion engine (not shown) for hybrid powering (e.g., with battery 112) of work machine 100. Battery 112 may also provide energy for powering other components of work machine 100, such as controllers, cooling systems, displays, actuators, sensors, etc.

Through powertrain 116, battery 112 may drive a set of ground engaging elements 114, shown as wheels in FIG. 1, that are mounted to frame 102. Ground engaging elements 114 may additionally or alternatively include tracks, skids, or the like. When the drive motors of powertrain 116 are energized, the drive motors consume energy stored in battery 112 to cause ground engaging elements 114 to rotate to enable work machine 100 to traverse a surface, typically the ground.

In addition, work machine 100 can have one or more brake systems (not shown), such as a service brake system, a regenerative brake system, and/or a resistive brake system. The service brake system can be a hydraulic braking system or other braking system configured to apply brake pads against rotors to frictionally slow down wheels of work machine 100. The regenerative brake system can be configured to capture kinetic energy and/or potential energy during braking and/or deceleration of work machine 100 and to store the captured energy in battery 112. The resistive brake system can be a dynamic braking system that is configured to similarly capture kinetic energy and/or potential energy during braking and/or deceleration of work machine 100 and to dissipate the energy as heat in one or more resisters in work machine 100.

To help carry out a job function, work machine 100 may include a work implement 118, such as a bucket as shown in FIG. 1, coupled to the frame 102. Work implement 118 may be operable by at least one actuator 120, such as a hydraulic linkage as illustrated in FIG. 1. Other forms of work implements and actuators for causing movement and manipulation of the work implement may be used alternatively.

In some situations, work machine 100 can be positioned to travel around a confined worksite to perform a job or task, such as relocating or hauling earthen material. To do so, work machine 100 can travel within the worksite from a charging station to one or more work locations and then to a same or different charging station when the SoC of battery 112 becomes low. In some situations, work machine 100 may expend most or all of its battery capacity without traveling more than a few hundred meters from a charging station.

Work machine 100 can be a staffed machine, a semi-autonomous machine, or an autonomous machine. In examples in which work machine 100 is a staffed machine or a semi-autonomous machine, a human operator or driver can operate, control, or direct some or all of the functions of work machine 100, typically from within operator cab 104. However, in examples in which work machine 100 is autonomous or semi-autonomous, functions of work machine 100, such as steering, speed adjustments, work tool positioning and movement, and/or other functions can be fully or partially controlled, automatically or semi-automatically, by onboard and/or off-board controllers or other computing devices associated with work machine 100.

A controller, also known as an electronic control module or unit (ECM 130), provides centralized processing and control for work machine 100 in coordination with operator interface 106. The term "controller" is meant to be used in its broadest sense to include one or more controllers and/or microprocessors that may be associated with the work machine 100 and that may cooperate in controlling various functions and operations of the machine. The functionality of ECM 130 may be implemented in hardware and/or software without regard to the functionality. ECM 130 may include a memory, which may store instructions or algorithms in the form of data, and a processing unit configured to perform operations based upon the instructions. The memory may be any suitable computer-accessible or non-transitory storage medium for storing computer program instructions, such as RAM, SDRAM, DDR SDRAM, RDRAM, SRAM, ROM, magnetic media, optical media and the like. The ECM 130 may be a single controller or multiple controllers working together to perform a variety of tasks. ECM 130 may embody a single or multiple microprocessors, field programmable gate arrays (FPGAs), digital signal processors (DSPs), and/or other components configured to generate a compaction plan, one or more travel paths for work machine 100 and/or other information useful to an operator of work machine 100. Numerous commercially available microprocessors can be configured to perform the functions of ECM 130. Various known circuits may be associated with ECM 130, including power supply circuitry, signal-conditioning circuitry, actuator driver circuitry (i.e., circuitry powering solenoids, motors, or piezo actuators), and communication circuitry. In some examples, ECM 130 is positioned on work machine 100, while in other examples ECM 130 is positioned at an off-board location and/or remote location relative to work machine 100.

As shown in FIG. 1, work machine 100 additionally includes a battery thermal management system (BTMS) 132. BTMS 132 is a fluid system that provides heating or cooling to regulate the temperature of battery 112 in various circumstances. As known to those of ordinary skill in the field, the performance, health, and life of battery 112 may be affected by the temperature in which it operates. Depending on the chemistry of cells within battery 112, a most efficient preconditioning temperature may be within a temperature range of about 15-35 degrees C. (60-95 degrees F.). At any given time, the temperature of battery 112 may be above or below its most efficient charging temperature due, for instance, to the ambient temperature from weather at a job site for work machine 100 or due to heat generated by battery 112, powertrain 116, or other components within work machine 100.

BTMS 132 may include several components configured to operate in an active thermal mode or a passive thermal mode under the coordination of ECM 130 based on the thermal and energy states of work machine 100. In the active thermal mode, energy is drawn from battery 112 to activate a heating element to add heat to a fluid system or to activate a chiller to extract heat from the fluid system to adjust the temperature of battery 112 accordingly. In the passive thermal mode, energy is generally not drawn from battery 112 to regulate the temperature. Instead, the battery temperature may be regulated using convection and conduction with a radiator on the fluid system based on a temperature difference between the battery and the ambient environment.

Figure 2:
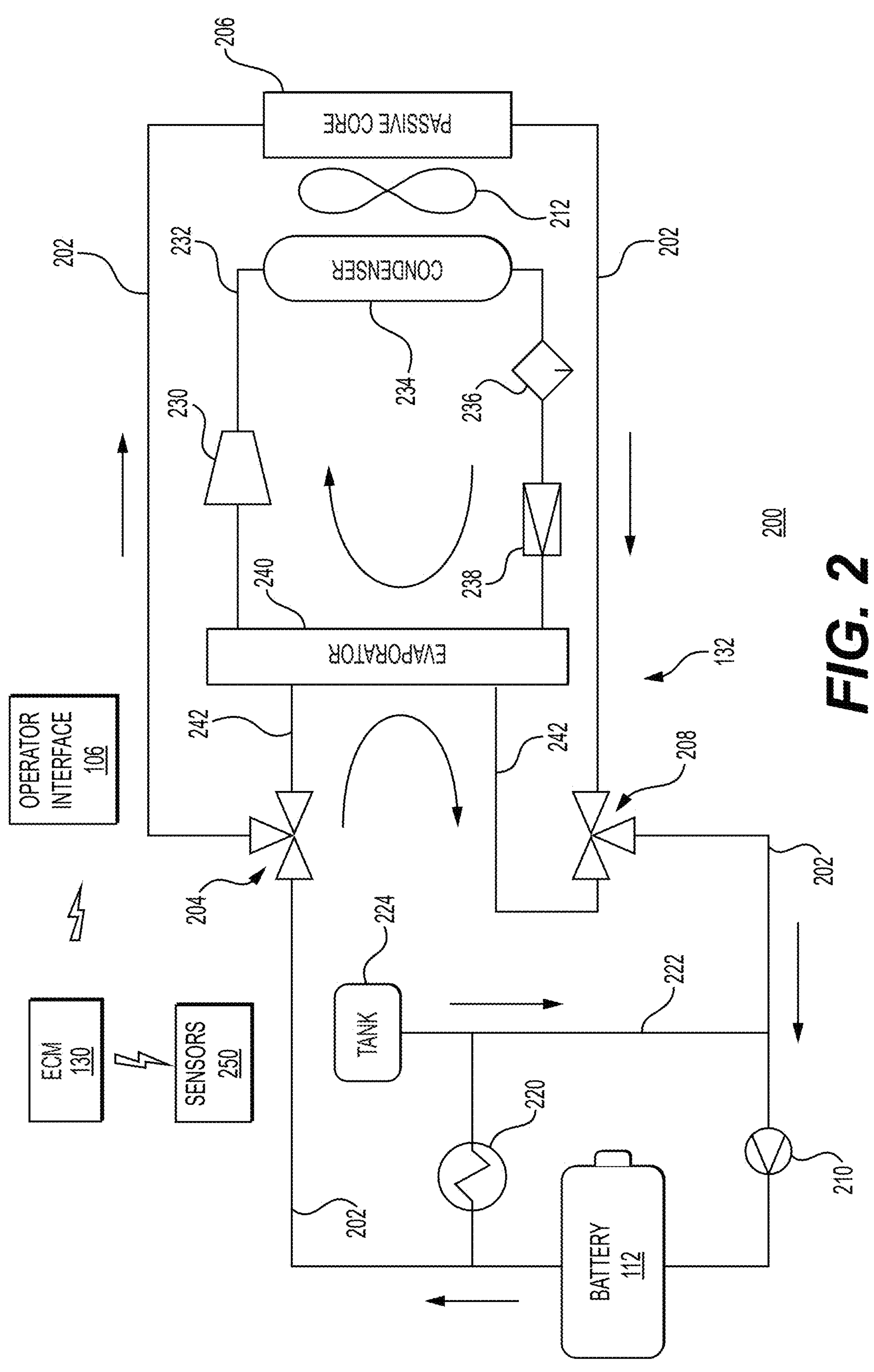
FIG. 2 is a schematic block diagram of a control system including a battery thermal management system within the electrically powered work machine of FIG. 1 in accordance with an example of the present disclosure.

Turning from the general structure of an exemplary work machine 100, FIG. 2 illustrates a schematic block diagram of a control system 200 and an exemplary BTMS 132 in accordance with the principles of this disclosure. In general, control system 200 may include at least ECM 130 communicating with operator interface 106 and communicatively coupled (e.g., by an electrical connection and/or by a wireless connection) to control and coordinate the functioning of various components within BTMS 132 at least through one or more sensors 250. As shown in the lower left of FIG. 2, at least one of sensors 250 may be associated with, and possibly arranged in proximity to, battery 112 to detect its operating conditions. These battery operating conditions may include battery cell temperature, current SoC of the battery, and a state of health (SoH) of the battery, such as abilities of battery 112 to maintain a charge, receive a charge, and/or transfer energy at a power level. Sensors 250 are configured to communicate parameters about those conditions as data to ECM 130. Sensors 250 may be positioned at other locations within BTMS 132 to detect and communicate temperatures and other operating conditions to ECM 130, independently or under instruction from ECM 130.

When operating in the passive thermal mode, BTMS 132 exchanges thermal energy with battery 112 using a fluid path 202 that travels around the perimeter of the schematic block diagram in FIG. 2. Fluid path 202 includes tubes, pipes, or similar conduits or passages that contain a thermally conductive fluid, which may be a liquid such as water, glycol, propylene glycol, ethylene glycol, a refrigerant, or a combination thereof. As generally illustrated in FIG. 2, fluid path 202 extends from battery 112 through a valve 204, to a passive core 206 at the far right of FIG. 2, through a valve 208 to a pump 210, and back to battery 112.

Fluid path 202 is positioned such that the thermally conductive fluid within fluid path 202 contacts, passes through, or is positioned to thermally affect, the battery 112 due to a temperature difference between the fluid and battery 112. During a passive thermal mode, pump 210 causes the thermally conductive fluid to flow through battery 112 for a thermal exchange and then to valve 204. In some examples, such as shown in FIG. 2, valve 204 is a three-way valve controlled by ECM 130. Although valve 204 is depicted as a three-way valve, where the valve can direct liquid flow in one of two directions, it should be understood that valve 204 (and valve 208 discussed below) may be implemented in any variety of ways known to those skilled in the field to accomplish the same or similar results. As depicted in FIG. 2, in a passive thermal mode for BTMS 132, ECM 130 causes valve 204 to direct the thermally conductive fluid from battery 112 further along fluid path 202 to passive core 206.

In some examples, passive core 206 is a radiator or similar type of heat sink structured to extract heat from the thermally conductive fluid flowing in fluid path 202. This heat transfer in a passive thermal mode may occur in part due to ambient temperature in the environment surrounding passive core 206 being lower than a temperature of the thermally conducive fluid. The heat transfer may also occur in part due to convective forces imparted by a fan 212 blowing across passive core 206, possibly under control of ECM 130. In other circumstances, passive core 206 could transfer heat to the thermally conductive fluid when the environment surrounding passive core 206 is hotter than the fluid.

In the passive thermal mode, the fluid path 202 continues from passive core 206 to battery 112, via valve 208 and pump 210. Valve 208 may be a three-way valve controlled by ECM 130 to direct the thermally conductive fluid from one of two sources toward pump 210. Pump 210 may be an electrically controlled water pump, for example, that may operate under the control of ECM 130 to cause the flow of the thermally conductive fluid back to battery 112 at a controlled rate. Additional pumps or similar devices may also be employed to help move the thermally conductive fluid through ECM 130.

The thermal transfer occurring in a passive thermal mode of operation for BTMS 132 typically draws little energy from battery 112. In essence, only pump 210 and fan 212 contain motors requiring electrical power to operate. As a result, while the thermal efficiency in the passive thermal mode may be low depending on the temperature difference between the external environmental and the thermally conductive fluid, the electrical efficiency is high.

When operating in the active thermal mode, BTMS 132 may exchange thermal energy between battery 112 and fluid path 202 using a portion of fluid path 202 between valve 204 and valve 208, together with either a heating route 222 or a cooling route 242. For active heating, BTMS 132 may include heating route 222 for allowing the thermally conductive fluid to flow through a heating element 220 in parallel with battery 112, as shown in FIG. 2. Heating element 220 may include resistive coils or other devices for imparting thermal energy to thermally conductive fluid received from fluid path 202. Heating route 222 may include an expansion tank 224 for absorbing any excess thermally conductive fluid caused by thermal expansion. Thus, as needed, such as when sensors 250 detect a battery cell temperature that is lower than a preset value, perhaps also taking into account ambient temperature, ECM 130 may activate heating element 220 to increase the temperature of the thermally conductive liquid that is then drawn along heating route 222 and through battery 112 by pump 210.

For active cooling, BTMS may include a cooling route 242 for allowing the thermally conductive fluid to flow through an evaporator 240 and in parallel with battery 112, as shown in FIG. 2. When ECM 130 determines the need for active cooling, such as when sensors 250 detect a battery cell temperature above a preset value, perhaps also taking into account ambient temperature, ECM 130 may cause valve 204 to direct thermally conductive fluid arriving on fluid path 202 to be output on cooling route 242. The thermally conductive fluid then flows through evaporator 240. Similarly, ECM 130 may cause valve 208 to direct thermally conductive fluid arriving on cooling route 242 from evaporator 240 to be output on fluid path 202 toward pump 210.

Evaporator 240, which may also be referred to as a chiller, functions as a heat exchanger that may remove heat from the thermally conductive fluid passing along cooling route 242 and through the evaporator. At an opposite side of evaporator 240, a refrigerant path 232 forms a closed loop between a compressor 230, a condenser 234, a dryer 236, an expansion valve 238, and the evaporator 240. A refrigerant of any suitable type, such as R134a, freon, a hydrofluorocarbon, or any compressible gas or liquid, passes along refrigerant path 232. In a known manner, the refrigerant is compressed by compressor 230, undergoes a state change in condenser 234, and has its flow regulated by expansion valve 238 during a refrigeration cycle. At evaporator 240, thermal energy from the thermally conductive fluid passing through cooling route 242 is transferred to the refrigerant, lowering the temperature of the thermally conductive fluid in cooling route 242. Accordingly, the thermally conductive fluid with a lower temperature passes through valve 208 and is drawn by pump 210 across battery 112 to help lower the battery cell temperature detected by sensors 250.

Variations to BTMS 132 in FIG. 2 are within the scope of the present disclosure. For example, BTMS 132 may exclude the active cooling portion with refrigerant path 232. In other examples, BTMS 132 may exclude the active heating portion with heating element 220. Further, a different arrangement or selection of components for the heating and cooling functions are possible and known to those of ordinary skill in the field to accomplish the objectives described in this disclosure.

The thermal transfer occurring in an active thermal mode of operation for BTMS 132 can draw much larger amounts of energy from battery 112 than for a passive thermal mode of operation. In addition to the electrical draw for pump 210, heating element 220 and compressor 230, for example, will typically require large amounts of electrical current, potentially decreasing the battery SoC. As a result, while the thermal efficiency in the active thermal mode may be high, the electrical efficiency may be low, particularly when compared to the passive thermal mode.

In some operating conditions for work machine 100, control system 200 may cause BTMS 132 to align the battery cell temperature closely with the ideal preconditioning temperature for battery 112. But that mode of operation could cause unnecessary drain on battery 112. Allowing the battery cell temperature to drift from the preconditioning temperature due to ambient temperature and/or heat generated by work machine 100, for example, would conserve the SoC and extend the run time for work machine 100 during a job. As battery 112 begins to be depleted, however, BTMS 132 will need to return the operating temperature of the battery (i.e., the battery cell temperature) to (or near) the preconditioning temperature of highest charging efficiency for battery 112 if a Fast Charge at high power will be conducted.

In accordance with the principles of this disclosure, in expectation of an upcoming Fast Charge, ECM 130 of control system 200 is programmed or otherwise configured to monitor the SoC of battery 112, to selectively provide a notification through operator interface 106 when the SoC reaches a threshold SoC, and to adjust a battery cell temperature to an ideal or preferred preconditioning temperature using BTMS 132. In this context, the "threshold SoC" refers to a state of charge for battery 112 at which ECM 130 determines that a notification should be provided to an operator about the need for preconditioning if a Fast Charge is desired. As discussed in more detail below, while various factors may be included in determining a threshold SoC at which to notify an operator, the threshold SoC will typically account for an amount of battery charge required for BTMS 132 to complete a preconditioning of battery 112.

Figure 3:
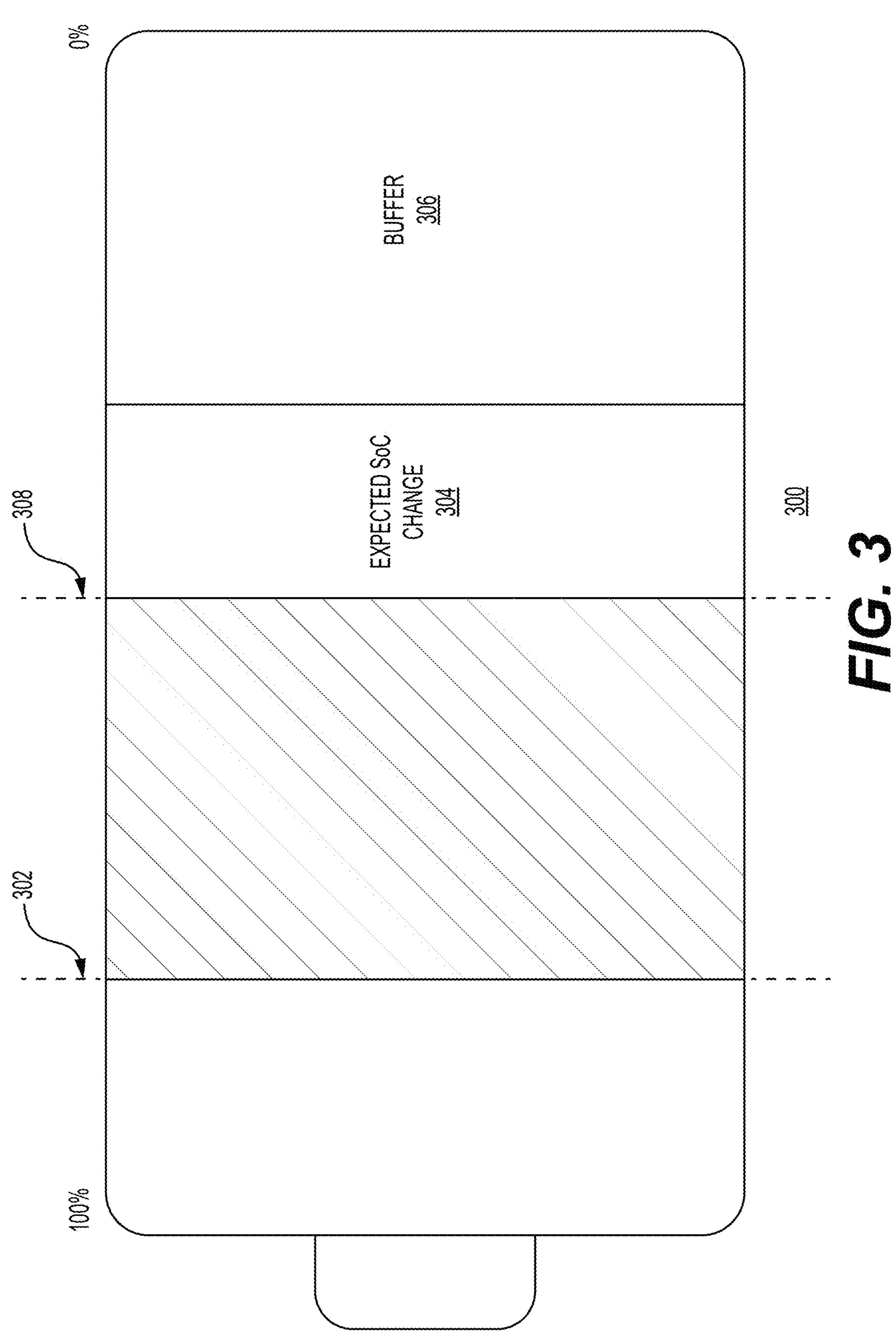
FIG. 3 is a graphical depiction of charge capacity for a battery within the electrically powered work machine of FIG. 1 in accordance with an example of the present disclosure.

FIG. 3 depicts an example breakdown of charge capacity 300 for battery 112 during operation within work machine 100 as context for discussing the operations of ECM 130 and BTMS 132. In FIG. 3, charge capacity 300 ranges from 100% at the left to 0% at the right. Battery 112 has a current SoC 302 at the present time of about 80%, as shown in FIG. 3. In this example, ECM 130 calculates an expected SoC change 304 when preconditioning battery 112 of about 15%. Additionally, consistent with the discussion below, ECM 130 in this example applies a buffer 306 of about 30% of a full charge. As a result, in the example of FIG. 3, ECM 130 calculates a threshold SoC 308 at which a notification should be provided to operator interface 106 as 45% of the charge capacity 300 for battery 112.

In some examples, ECM 130 is configured to determine an expected SoC change 304 under the current operating conditions for battery 112. As discussed above, BTMS 132 can require a variable amount of electrical energy from battery 112 to adjust the battery cell temperature. Adjusting the battery cell temperature to equal or approximate the desired preconditioning temperature may similarly require different levels of energy, and a corresponding decrease in SoC, depending on a variety of factors. For instance, a large difference between the current battery cell temperature and the desired preconditioning temperature would require more energy, and possibly a longer time, for BTMS 132 to make the adjustment than if the temperature difference were small. Those temperature differences, and the ambient temperature within the current operating conditions, may impact whether ECM 130 decides to implement the active thermal mode or the passive thermal mode of thermal management. An active thermal mode of adjustment generally will require much more charge from battery 112 than will a passive thermal mode of adjustment by BTMS 132.

Other parameters about battery 112 may also affect the amount of charge (or, similarly, an amount of time) for preconditioning. Parameters regarding the SoH of battery 112 received from sensors 250 may inform ECM 130 about the rate of change of the SoC, the battery's capacity, and the life of the battery. ECM 130 may be programmed to consider these and similar parameters, which may help indicate the health of the battery cells and the efficiency at which they will be able to supply charge required by BTMS 132 for the preconditioning. For instance, if battery 112 is near its end of life and has exhibited a rapid rate of change of its SoC during the current charge cycle, perhaps due to the job functions in the current operating conditions, ECM 130 may calculate an expected SoC change 304 to precondition battery 112 that is relatively large. On the other hand, if battery 112 is new, not being heavily taxed in the current operating environment, and exhibiting a slow rate of change of its SoC, ECM 130 may calculate an expected SoC change 304 to precondition battery 112 that is relatively small.

The capacity and efficiency of BTMS 132 may also impact a calculation or prediction of the expected SoC change 304 that would be caused by preconditioning battery 112 under the current operating conditions for work machine 100. If the fluid system within BTMS 132 is large (i.e., fluid path 202, heating element 220, compressor 230, evaporator 240, etc. have capacity to rapidly modify the battery cell temperature), ECM 130 may conclude that BTMS 132 can quickly achieve the preconditioning temperature and will require a corresponding small change in SoC. Conversely, an undersized BTMS 132 may require a long time to adjust the battery cell temperature to the preconditioning temperature, resulting in a larger expected change in SoC.

ECM 130 may consider these and other factors to determine an expected SoC change 304 for battery 112 due to a preconditioning process. Depending on the work machine, fewer or more factors may be consulted to reach a determination of how long it will take, or similarly, how much charge will be depleted, for the battery cell temperature to be changed to the preconditioning temperature. ECM 130 should provide a notification of the preconditioning event to an operator at least that amount of time before, or with that amount of charge remaining, to ensure that the preconditioning can be accomplished before a Fast Charge should start.

Upon determining an expected SoC change 304 from preconditioning battery 112 under the current operating conditions, in some examples, ECM 130 applies a buffer 306 to the expected SoC change 304 to result in threshold SoC 308. Buffer 306, which may be derived from a variety of issues and data, would provide an additional amount of charge (or time) that should be included in determining the point at which an operator should be notified of preconditioning, i.e., threshold SoC 308. In some examples, buffer 306 includes an amount of charge (or time) that should be allocated for the operator to complete the current job and to return to a charging station within the work site. For instance, as shown in FIG. 3, ECM 130 determines to add a buffer of 30% of the full SoC for battery 112 to the expected SoC change 304. The combination of buffer 306 and the expected SoC change 304 from preconditioning would result in a threshold SoC 308 at which notification should be provided to the operator.

ECM 130 can derive buffer 306 included within a threshold SoC 308 in a number of ways. For instance, buffer 306 could be a fixed and predetermined value, such as 10% of the full SoC for battery 112, or ECM 130 could calculate the buffer based on the type and location of work machine 100 within a work site. As one example, different types of work machines can have significantly different ground speeds, as exemplified by the physical differences between a wheel loader, an excavator, and a dozer. As a result, the amount of charge (or time) required for work machine 100 to travel to a charging station may depend on its characteristics, which ECM 130 may consider in selecting a buffer 306, as well as on its distance from the charging station. Those of ordinary skill in the field will appreciate that ECM 130 may process these and other factors in determining an appropriate buffer to add to an expected decrease in the SoC from preconditioning to result in a threshold SoC 308.

Figure 4:
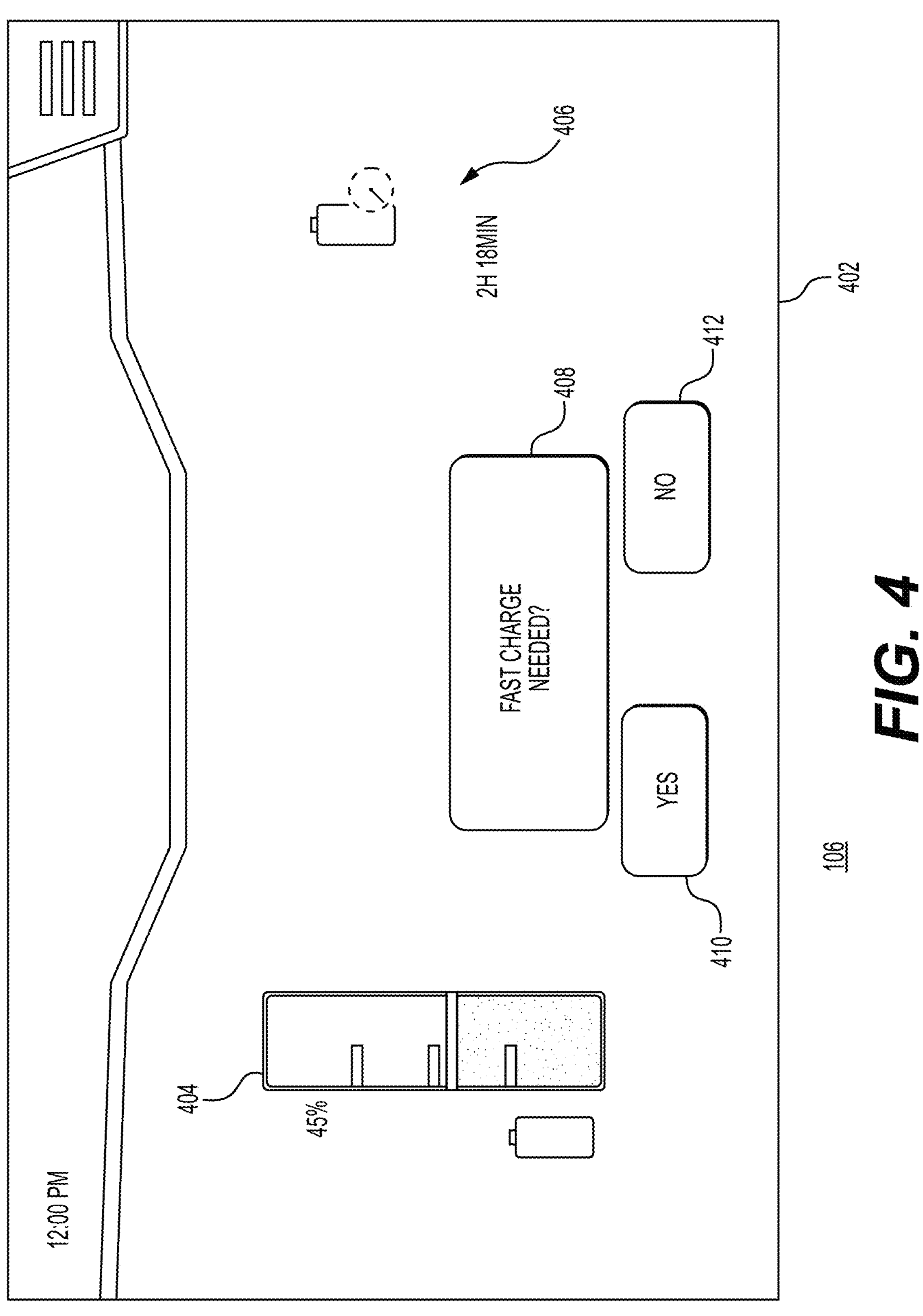
FIG. 4 is a graphical layout of an operator interface within the electrically powered work machine of FIG. 1 in accordance with an example of the present disclosure.

Following these principles, FIG. 4 depicts an exemplary graphical layout 402 within operator interface 106 for notifying an operator of a need for preconditioning to prepare for a Fast Charge. While FIG. 4 is directed to a graphical layout for purposes of illustration, a notification via operator interface 106 is not limited to exemplary graphical layout 402. Notification may be made in other ways, such as through textual messages, audible alerts, tactile feedback, or other forms of sensory communication decipherable by an operator of work machine 100.

In the example of FIG. 4, graphical layout 402 includes several icons or pictorial displays communicating the current SoC 302 of battery 112. At the left of the display, for instance, chart 404 indicates as an example a current SoC of 45%. At the right of the display, icon 406 and text indicate the estimated time remaining until battery 112 is depleted. Consistent with the principles of this disclosure, notification 408 appears on operator interface 106 when threshold SoC 308 equals or exceeds the current SoC 302 for battery 112 and queries whether a Fast Charge of battery 112 is needed. ECM 130 may be configured to cause notification 408 to attract the attention of an operator of work machine 100, such as by being displayed in bright colors, large typeset, or flashing graphics. Additionally, or alternatively, ECM 130 may accompany notification 408 with an audible or tactile alert.

In exemplary graphical layout 402, a user-selectable acceptance 410 ("Yes") and a user-selectable refusal 412 ("No") are also displayed as keys on operator interface 106. While illustrated as soft keys on a touch-sensitive screen, user-selectable acceptance 410 and user-selectable refusal 412 may be hard keys, keys activated by a mouse or pointer, or any other implementation for achieving the stated results. An operator of work machine 100 can respond to notification 408 ("Fast Charge Needed?") by selecting either of the user-selectable soft keys. If user-selectable acceptance 410 is chosen, ECM 130 will command BTMS 132 to adjust the battery cell temperature of battery 112 to equal the preconditioning temperature for that battery. If user-selectable refusal 412 is pressed, ECM 130 will not initiate preconditioning and, in general, will continue controlling work machine according to its existing parameters.

In some examples, ECM 130 is configured to start a timer (not shown) when causing operator interface 106 to display notification 408. The timer may be set to a predetermined value, giving a period of time for the operator to respond to the notification. If neither the user-selectable acceptance 410 nor the user-selectable refusal 412 is chosen before the timer expires, control system 200 using ECM 130 will in some examples proceed with preconditioning the battery. An operator may be too occupied with operating work machine 100 to notice or respond to notification 408. Starting a preconditioning process after a short delay without a response may ensure that work machine 100 is prepared to receive a Fast Charge as a default so that the machine can continue with its job rather than having to be taken offline for a Slow Charge. The timer may be any tool for measuring time available to ECM 130, including a count-up timer, a count-down timer, a setpoint triggered by an event after initiating notification 408, and other techniques known to those skilled in the field.

If control system 200 receives a response from user-selectable refusal 412, ECM 130 may control BTMS 132 to regulate the battery cell temperature in either the passive thermal mode or the active thermal mode based on the current operating conditions of work machine 100, such as the ambient temperature and energy demands on battery 112. In some examples, a refusal to accept a Fast Charge suggests that the operator is nearing the end of a job and that a Slow Charge at low power over a longer period of time is acceptable. By operating in the passive thermal mode in accordance with the current operating conditions, BTMS 132 can conserve the remaining battery charge, or at least not divert that charge to adjusting the battery cell temperature unnecessarily, and accordingly retain battery charge and provide more run time for work machine 100 than if preparing for a Fast Charge.

Figure 5:
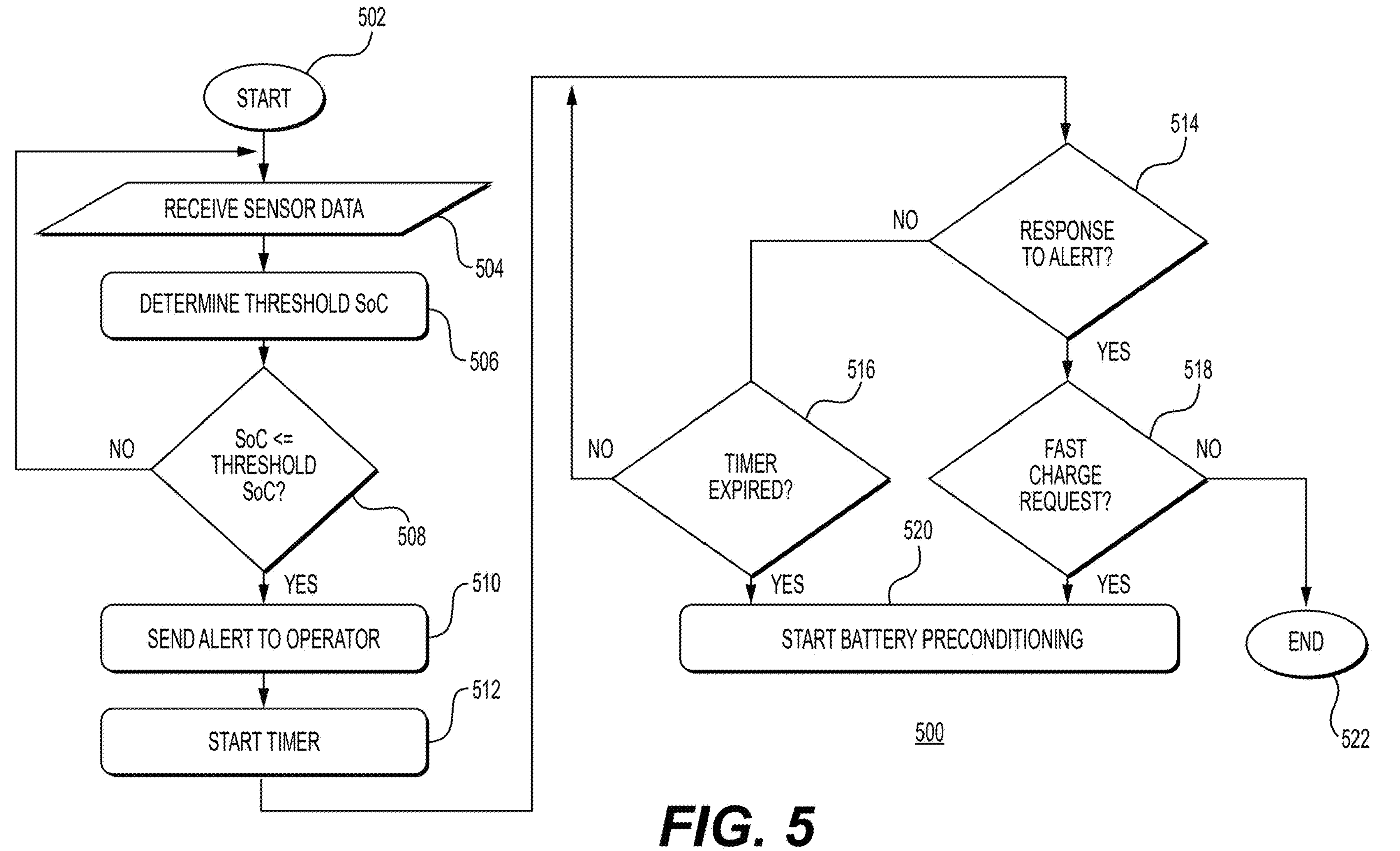
FIG. 5 is a flow chart depicting a method for controlling battery preconditioning in a work machine in accordance with an example of the present disclosure.

Turning from the structure and operation of work machine 100 as illustrated in FIGS. 1-4 to a method involving this system, FIG. 5 is a flowchart of a representative method for controlling battery preconditioning in a work machine. The example process 500 is illustrated as a collection of steps in a logical flow diagram, which represents operations that can be performed in initiating battery preconditioning. The order in which the operations are described is not intended to be construed as a limitation, and any number of the described steps can be combined and performed in any order, in parallel, or simultaneously to implement the process.

Generally embodied as 500 in FIG. 5, the method begins at start 502 and proceeds during operation of a work machine 100 to a step 504 of receiving sensor data. As explained above with respect to FIGS. 2 and 3, control system 200 within work machine 100 may include ECM 130 that is configured to receive data from one or more sensors 250 arranged throughout the machine, including within BTMS 132. The sensor data may include information relating to the SoC or SoH of battery 112, various temperatures at components and within fluids in BTMS 132, and other physical parameters about work machine 100.

In step 506, a threshold SoC is determined. As illustrated in FIGS. 2 and 3 and discussed above, for example, ECM 130 calculates or determines from data received from sensors 250 a threshold SoC 308 related to work machine 100 at which an alert or notification should be provided to an operator of the machine. For example, ECM 130 may evaluate data such as the SoC and SoH of battery 112, a type of work machine 100, the rate of change of the SoC, the size or capacity of BTMS 132, the size and age of battery 112, and other factors to project an expected change 304 in SoC from adjusting a battery cell temperature to be equal to a charging temperature of high efficiency, or preconditioning temperature, for the battery. In addition, ECM 130 may access from memory or otherwise determine a buffer 306 of charge (or time) to be added to the expected change 304 in SoC to result in the threshold SoC 308 at which an alert or notification should be provided.

In a step 508, the SoC and threshold SoC are compared. In particular, ECM 130 may be programmed to see if a current SoC 302 for battery 112 is less than or equal to the calculated threshold SoC 308. If not, the process 500 returns to step 504, and ECM 130 continues to receive data from sensors 250. If current SoC 302 is less than or equal to threshold SoC 308, ECM 130 will cause an alert or notification to be presented to an operator of work machine 100 (step 510), such as being displayed on operator interface 106. As discussed above, the notification provides information on operator interface 106 about, for example, the SoC of battery 112 and provides a query regarding whether a Fast Charge is desired. The notification may further include arrangements for an operator to answer the query, such as through inputs for a user-selectable acceptance 410 ("Yes") and a user-selectable refusal 412 ("No"). Coincident with the notification, ECM 130 will start a timer (step 512). The timer, which may be any type of counter of time, will track the passage of several minutes in some examples.

During the counting of the timer, the process 500 waits for a response to the alert or notification (step 514). While no response is received, the process continues to monitor the timer and evaluate any feedback from an operator (step 516). If a response to the notification is received, in a step 518, the process determines whether the response is an acceptance or a refusal of a Fast Charge. If the response is a refusal, perhaps because the operator is almost finished with a job and has time for a Slow Charge, the process will advance to an end 522 and stop. If, however, the response is an acceptance, perhaps because the operator has more work to do with the machine and wishes to recharge quickly, process 500 will advance to step 520 where battery preconditioning will begin. Similarly, if no response is received to the notification (step 514) and the timer has expired (step 516), control system 200 will commence battery preconditioning (step 520) in the same manner.

As discussed in detail above, during step 520, control system 200 will cause BTMS 132 to adjust battery cell temperature to equal the preconditioning temperature, possibly invoking an active thermal mode within BTMS 132 to do so. During preconditioning, BTMS 132 will draw current from battery 112 as forecasted, with buffer 306 retaining adequate charge to power work machine 100 after the preconditioning temperature is reached.

Those of ordinary skill in the field will appreciate that the principles of this disclosure are not limited to the specific examples discussed or illustrated in the figures. For example, while the battery preconditioning has been discussed in the context of a battery-electric machine, similar but different steps may be followed to apply the disclosed principles to a machine including other power sources, such as a battery-electric vehicle, a hybrid, or any other mobile machine that is at least partially powered by a battery. Additionally, while discussed in terms of a work machine manually operated from within an operator cab 104, a notification may be provided to an operator module external to work machine 100 when being operated autonomously or semi-autonomously. As well, further factors may be included for evaluating and determining an expected change 304 in SoC and a buffer 306 within a threshold SoC 308 than those listed above without departing from the intended purpose of the disclosed system.

INDUSTRIAL APPLICABILITY

The present disclosure provides a work machine powered by a battery with a control system for determining a threshold state of charge for the battery at which to seek instruction from an operator whether to precondition the battery for a Fast Charge. The control system evaluates various current parameters in the machine, such as battery cell temperature, ambient temperature, battery state of health, battery size, and capacity of a battery thermal management system, to determine an expected change in the state of charge caused by preconditioning the battery. A buffer amount of charge is added to define the threshold state of charge. When the threshold exceeds a current state of charge for the battery, the control system provides notification via an operator interface for an operator to elect or refuse a Fast Charge with battery preconditioning.

As noted above with respect to FIGS. 1-5, a work machine such as 100 in FIG. 1 includes a battery 112 as a power source and a BTMS 132 configured to regulate a temperature of the battery in different conditions. A control system 200 includes an ECM 130, sensors 250, and an operator interface 106 arranged to control battery cell temperature in different thermal modes with different demands on charge from the battery. Evaluating various data from sensors 250 under the current operating conditions of work machine 100, ECM 130 projects an expected decrease in SoC from preconditioning the battery and, after including a buffer amount of charge, determines a threshold SoC 308. When a current SoC 302 equals or falls below the threshold SoC 308, ECM 130 causes the operator interface to display a notification about the potential for a Fast Charge. If the operator accepts, or if the operator does not respond after a predetermined time, the control system instructs BTMS 132 to adjust the battery cell temperature to equal the preconditioning temperature for that battery. The BTMS may employ an active thermal mode that draws significant charge from the battery, as contemplated by the threshold SoC 308. If the operator declines the Fast Charge, the control system continues in its normal mode of operation, possibly restricting the BTMS to a passive thermal mode to conserve the remaining battery charge.

In the examples of the present disclosure, the control system within a battery-powered work machine provides prediction of an amount of charge needed to precondition a battery under current operating conditions tailored to the machine, such that an operator may be alerted while sufficient charge remains. Timely notification through an operator interface enables initiation of preconditioning using an active thermal mode for a Fast Charge in good time if more work is to be done. Conversely, battery life and run time may be extended using a passive thermal mode if a Slow Charge is sufficient and selected by the operator. Conventional criteria for preconditioning in a passenger vehicle, such as driving speed and distance as determined by a navigation system, need not be considered.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Terms of approximation are meant to include ranges of values that do not change the function or result of the disclosed structure or process. For instance, the term "about" generally refers to a range of numeric values that one of skill in the art would consider equivalent to the recited numeric value or having the same function or result. Similarly, the antecedent "substantially" means largely, but not wholly, the same form, manner or degree, and the particular element will have a range of configurations as a person of ordinary skill in the art would consider as having the same function or result.

While aspects of the present disclosure have been particularly shown and described with reference to the examples above, it will be understood by those skilled in the art that various additional examples may be contemplated by the modification of the disclosed systems and methods without departing from the spirit and scope of what is disclosed. Such examples should be understood to fall within the scope of the present disclosure as determined based upon the claims and any equivalents thereof.

What is claimed is:

1. A work machine, comprising:

a work implement;

one or more actuators positioned to impart forces on the work implement;

a battery configured to power the work machine, the battery having a state of charge (SoC) and a battery cell temperature;

sensors positioned to detect at least the SoC and the battery cell temperature;

a battery thermal management system (BTMS) configured to regulate the battery cell temperature;

an operator interface configured to receive inputs and to display outputs relating to operation of the work machine; and an electronic controller communicatively coupled to at least the BTMS and the operator interface, the electronic controller configured to:

receive input from the sensors relating to the SoC and the battery cell temperature, determine an expected change in the SoC caused by preconditioning the battery under current operating conditions, based, at least in part, on the expected change in the SoC, determine a threshold SoC at which to provide a notice on the operator interface, the notice being associated with a need to charge the battery, when the threshold SoC exceeds the SoC, provide the notice on the operator interface, monitor the operator interface for a response to the notice, the response comprising a request for a Fast Charge or a refusal of the Fast Charge, and in absence of receiving the response within a predetermined time after the notice, command the BTMS to precondition the battery.

2. The work machine of claim 1, wherein the current operating conditions include battery cell temperature, ambient temperature, and battery capacity.

3. The work machine of claim 2, wherein the current operating conditions include a capacity of the BTMS.

4. The work machine of claim 3, wherein the current operating conditions include a rate of change for the SoC.

5. The work machine of claim 1, wherein the BTMS comprises an active thermal mode and a passive thermal mode, and the electronic controller is further configured to:

after receiving the request for the Fast Charge, command the BTMS to precondition the battery using the active thermal mode.

6. The work machine of claim 1, wherein the BTMS comprises an active thermal mode and a passive thermal mode, and the electronic controller is further configured to:

after receiving the refusal of the Fast Charge, command the BTMS to regulate the battery cell temperature using one of the active thermal mode and the passive thermal mode based on the current operating conditions of the work machine.

7. The work machine of claim 1, where the electronic controller is further configured, upon providing the notice on the operator interface, to activate a timer with the predetermined time.

8. The work machine of claim 1, wherein determining the threshold SoC comprises adding at least a buffer to the expected change in the SoC, the buffer being an amount of charge sufficient for the work machine to complete a job and return to a charging station.

9. The work machine of claim 1, wherein the operator interface displays a first user-selectable input corresponding to the request for the Fast Charge and a second user-selectable input corresponding to the refusal of the Fast Charge.

10. A control system within a work machine, comprising:

a battery configured to power the work machine, the battery having a state of charge (SoC) and a battery cell temperature;

a battery thermal management system (BTMS) configured to regulate the battery cell temperature using one of an active thermal mode and a passive thermal mode;

an operator interface; and an electronic controller configured to:

calculate an expected decrease in the SoC caused by having the BTMS adjust the battery cell temperature to a preconditioning temperature under current operating conditions for the work machine, based, at least in part, on the expected decrease in the SoC, determine a threshold SoC at which to communicate a notification relating to preconditioning the battery, after the SoC equals the threshold SoC, communicate the notification via the operator interface, receive a response to the notification via the operator interface, the response comprising a request for a Fast Charge or a refusal of the Fast Charge, and based on the response, instruct the BTMS to adjust the battery cell temperature using one of the active thermal mode and the passive thermal mode.

11. The control system of claim 10, wherein the current operating conditions include battery cell temperature, ambient temperature, and battery capacity.

12. The control system of claim 11, wherein the current operating conditions include a capacity of the BTMS and a rate of change for the SoC.

13. The control system of claim 12, wherein the electronic controller is further configured to:

after receiving the request for the Fast Charge, instruct the BTMS to adjust the battery cell temperature to the preconditioning temperature using the active thermal mode.

14. The control system of claim 10, wherein the electronic controller is further configured to:

after receiving the refusal of the Fast Charge, instruct the BTMS to regulate the battery cell temperature using one of the active thermal mode and the passive thermal mode based on the current operating conditions of the control system.

15. The control system of claim 10, wherein the electronic controller is further configured to:

upon communicating the notification via the operator interface, activate a timer with a predetermined time; and in absence of receiving the response within the predetermined time after the notification, adjust the battery cell temperature to the preconditioning temperature.

16. The control system of claim 10, wherein determining the threshold SoC comprises adding at least a buffer to the expected decrease in the SoC, the buffer being an amount of charge sufficient for the work machine to complete a job and move to a charging station.

17. A computer-implemented method, comprising:

receiving, by an electronic controller, data relating to current operating conditions of a work machine powered by a battery, the current operating conditions including ambient temperature and a battery cell temperature of the battery;

calculating, by the electronic controller, an expected decrease in a state of charge (SoC) of the battery caused by having a battery thermal management system (BTMS) adjust the battery cell temperature to a preconditioning temperature under the current operating conditions;

based, at least in part, on the expected decrease in the SoC, determining a threshold SoC at which to provide a notification relating to preconditioning the battery;

comparing the SoC to the threshold SoC;

after the SoC equals the threshold SoC, communicating the notification via an operator interface;

receiving a response relating to the notification via the operator interface; and instructing the BTMS to regulate the battery cell temperature in response to the response.

18. The computer-implemented method of claim 17, further comprising:

causing the operator interface to display a first user-selectable input corresponding to a request for a Fast Charge and a second user-selectable input corresponding to a refusal of the Fast Charge.

19. The computer-implemented method of claim 18, wherein the response is the request for a Fast Charge and the instructing the BTMS comprises instructing the BTMS to adjust the battery cell temperature to the preconditioning temperature.

20. The computer-implemented method of claim 18, wherein the response is the refusal for a Fast Charge and the instructing the BTMS comprises instructing the BTMS to adjust the battery cell temperature to ambient temperature using one of an active thermal mode and a passive thermal mode based on the current operating conditions of the work machine.

* * * * *